Dec. 15, 1942.   C. KYLE   2,305,433
METHOD AND APPARATUS FOR MOLDING ARTICLES OF THERMOPLASTIC,
THERMOSETTING, OR RESINOUS MATERIALS
Filed Sept. 11, 1940

INVENTOR.
Witness:
Chas. P. Hursh
BY Colin Kyle,
Parkinson & Lane
ATTORNEYS.

Patented Dec. 15, 1942

2,305,433

UNITED STATES PATENT OFFICE 2,305,433

METHOD AND APPARATUS FOR MOLDING ARTICLES OF THERMOPLASTIC, THERMOSETTING, OR RESINOUS MATERIALS

Colin Kyle, Geneva, Ill., assignor to Jesse B. Hawley, Geneva, Ill.

Application September 11, 1940, Serial No. 356,254

4 Claims. (Cl. 18—42)

This invention relates to a method and apparatus for molding articles of thermoplastic, thermosetting or resinous materials, and more particularly to the provision and use of a thin shell of sheet or cast metal to be applied in or on a heated die or dies and on either one or both sides of the article to be molded to enable the shell or shells to be removed from the heated die or dies together with the article, so as to eliminate the necessity of first chilling the die or dies before removing the molded article.

In molding articles of thermoplastic, thermosetting or resinous materials, considerable heat and pressure are applied to the dies, and after the pressure has been applied it has heretofore been necessary to cool the die or dies before removing the molded article therefrom. Such cooling has been necessary in order to prevent the material of the molded article from sticking to the molding dies. This chilling of the dies has entailed much loss of time as well as limiting the amount of output.

By the present invention I have provided a thin metal shell to be applied to the inner face of the female die if a molded article having a glossy exterior is desired, and to both sides of the article if a glossy finish is desired on both sides. By being able to remove the shell with the heated pressed article, thus permitting the shell to be cooled after its removal from the heated dies, has enabled the continuous use of the heated dies without the loss of time that would otherwise be occasioned by chilling such heated die before removing the molded article and then reheating the die or dies for the molding of the next article. By the present invention this chilling of the heated dies is obviated and the molded article can be immediately removed together with the shell or shells for subsequent chilling or cooling to be accomplished in a separate chilling die or in the atmosphere or other cooling medium as desired.

This invention is applicable to articles made either with or without fibers, it being part of this invention when fibers are used to first accrete such fibers in a fibrous pulp bath and then thoroughly impregnating such fibrous article either before or after being dried with thermoplastic material, thermosetting material or resins, and then applying considerable pressure and desired temperatures to the dies to cause the thermoplastic, thermosetting or resinous materials to flow into and around the fibers to produce such article that will be reenforced and strengthener by the fibers. This invention is also applicable to the molding of such articles without fibers, in which case the fibers would be omitted and the thermoplastic, thermosetting or resinous materials molded directly between heated dies under considerable pressure.

My novel shells will be used in the dies regardless of whether or not fibers are used in the article, it being understood that the surface of the shell next to the molded article will be smooth and polished to give a smooth and ornamental surface to that portion of the molded article next to the shell. By removing the shell with the molded article from the heated dies the danger is eliminated of having the material of the article stick to the dies when removing the article from the dies before sufficient cooling is effected. In other words, the shell or shells will not be removed from the molded article until after sufficient cooling has been accomplished, which cooling, as stated above, may be done in a subsequent chilling die or otherwise as desired.

As soon as a molded article together with its shell or shells is removed from the heated dies a fresh shell will be applied to the heated dies and another article immediately molded therein, the shell remaining with the article until after the cooling is effected in a separate chilling die or otherwise. If desired, one of the dies may be a substantially rigid, hard, heated die and the other may be made of resilient material such as rubber, mechanically expanding jaws, and either heated or not. Also grooves may be formed in the rigid heated die, said grooves to either have holes through the wall of the heated die to permit heat to pass therethrough into the grooves, or such holes may be omitted, and when omitted heat may be passed through the grooves behind the metal shell during the heating operation and during the chilling operation cold water may be passed through these grooves.

Among the objects of my invention are to eliminate the disadvantages and accomplish the advantages set forth above.

Other objects, advantages and capabilities will later more fully appear or are inherent in the novel method and apparatus.

My invention further resides in the combination, construction and arrangement of parts illustrated in the accompanying drawing, and while I have shown therein preferred embodiments, I wish it understood that the same are susceptible of modification and change without departing from the spirit of my invention.

In the drawing:

Fig. 1 is a vertical transverse section through

Figure 1:
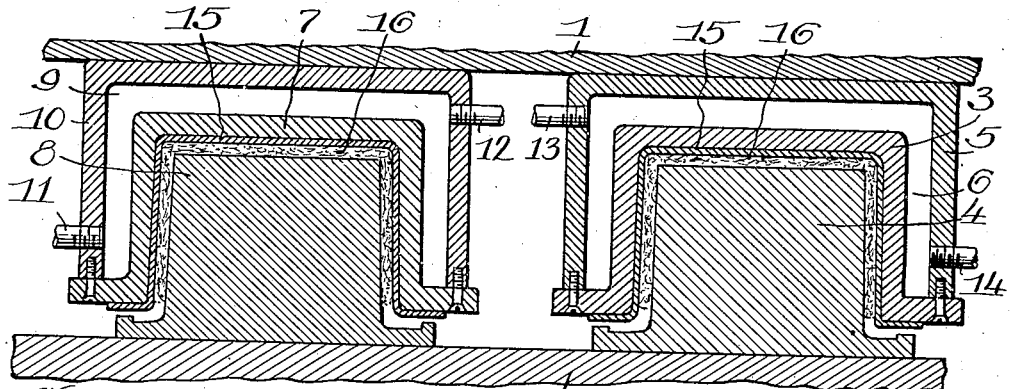

Referring in detail to the drawing, Fig. 1 shows the platens 1 and 2 of any suitable press for giving the required pressures, and between which platens are positioned a pair of heating and pressing molding dies 3 and 4, the female die 3 of which is provided with an outer casing 5 forming a space 6 therebetween. Also positioned between platens 1 and 2 is a pair of chilling dies comprising the female die 7 and the male die 8. Fixed to the female die 7 and spaced therefrom to form the space 9 is a casing 10. Dies 7 and 8 are cooled or chilled by cold water or other cooling fluid passing inwardly through the inlet pipe 11 into the space 9 around the female die 7, and then out through the outlet pipe 12 in order to chill the die after the molding has previously been performed in the heated female die 3 and the die 4. In the heating dies 3 and 4 steam or other heating medium is introduced through the inlet 13 into the space 6 between the female die 3 and the casing 5 to heat female die 3 to any desired temperature for the molding operation. The steam or other heating medium is then passed out through the outlet pipe 14. The male dies 4 and 8 in each of the heating and the chilling dies may be of solid or hollow metal smooth on its outer surface for molding purposes, or they may be of resilient material such as rubber or the like, or expanded outwardly by expanding jaws or the like (not shown).

One of the main features of this invention is the provision of a metal shell 15 closely fitting the inner surface of the female die 3, and having a smooth polished inner surface contacting the outer face of the article 16 being molded. As will be understood, the material of the article to be molded will be applied between the inside of the shell 15 and the exterior of the male die 4, and after the female die 3 has been heated to a sufficiently high temperature and the molding material inserted within the dies or mold, a heavy pressure is applied between the platens 1 and 2 to mold the article in the molding dies.

The material of the article to be molded may before molding be (1) fibers mixed with thermoplastic or thermosetting material or suitable resins; (2) thermoplastic or thermosetting material without fibers mixed therewith or forming part of the article, and (3) suitable resins with or without any desired filler such as wood-flour and the like.

In carrying out the operation of the apparatus shown in Fig. 1, I first place the smooth metal shell 15 within the interior of the female die 3, this shell closely fitting the contour of the inner surface of said female shell but preferably having sufficient draft along its side walls as to permit it together with its contained molded article to be readily removed from within the female die 3 after the molding operation has been completed. The material to be molded which, as stated, may be either an accreted fibrous carcass which has previously been dried together with the thermoplastic material, thermosetting material or suitable resins, and considerable pressure applied to the dies through the platens 1 and 2, as a result of which the material of the article to be molded will be sufficiently heated because of the hot female die, and under the pressure exerted will become plastic and flow to fill the space between the male and female dies and fill the mold.

As soon as sufficient heat and pressure have been applied to the dies and the article molded, the dies are separated and the shell 15 with its contained molded article will be removed from within the female die as a unit. This removal of the shell together with the contained molded article prevents any sticking of the material of the molded article to the die as the shell and molded article stay together. The molded article, which is still hot (the molding dies also still being hot), is after removal with its shell from the molding dies transferred to the chilling dies 7 and 8 in order to be quickly chilled by the introduction of cold water or other chilling fluid being introduced through the inlet pipe 11 into the space 9 and then out through the outlet pipe 12.

Upon such chilling the molded article and the shell 15 are then ready to be removed from the chilling dies, after which the shell 15 may be removed from the molded article 16, the molded article being then disposed of as desired, and the shell is then ready to at any desired future time be reinserted into the molding dies as described above. If desired, the molded article together with the shell 15 may after withdrawal from the molding dies be cooled in any way preferred, such as by applying cold water to the shell 15 by a spray, a stream or otherwise, after which the shell is readily removed from the molded article. In other words, the molded article together with the shell after removal from the heated molding dies is cooled in any manner desired, but for the purposes of speed and increased output it is preferable that the molded article and the shell 15 be introduced into the chilling dies, as stated above, for quick chilling.

As will be understood, as soon as a molded article with its shell is removed from the heated molding dies, said heated dies do not need to be chilled but can retain their molding heat and a new batch of material to be molded together with a shell which has previously been introduced into the molding die, may be molded in the molding dies with great rapidity and without any intermediate cooling operation of these molding dies. As explained above, the polished surface contacting the molded article 16 must remain in contact with such article until chilled in order to prevent the material of the article from sticking to the face of the mold or to the shell. By providing such shell this sticking of the material of the article to a face of the mold is eliminated for the reason that the shell is removed with the article and subsequently chilled before the shell is removed from the article, thus retaining the smooth polished surface on the outside of the molded article. While in all of the views of the drawing I have shown only one shell, it is to be understood that a separate shell can be used on both the outside and the inside of the molded article if a smooth polished surface is desired on both surfaces.

Figure 2:
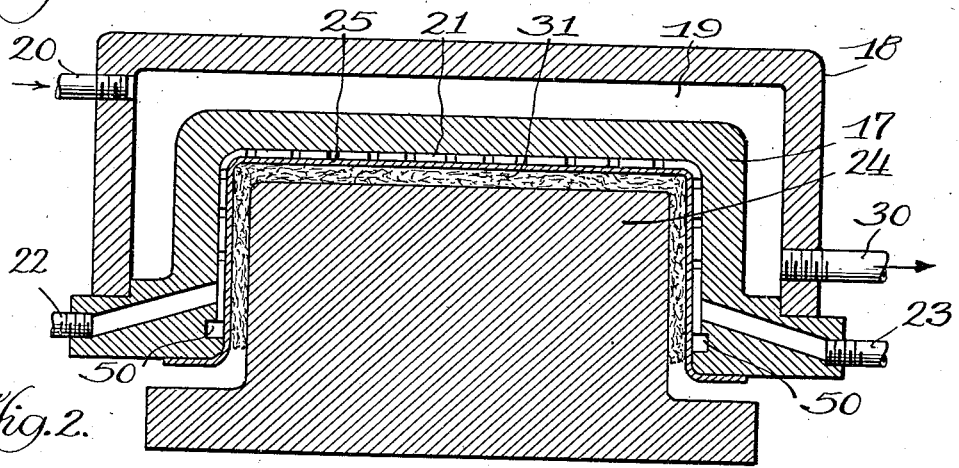
Fig. 2 is a vertical transverse section through a modified form of a pair of pressing dies embodying my invention.

In Fig. 2 I have shown a pair of dies which may be used for both heating and cooling one or the other of the molding dies. In the form shown in Fig. 2 the female die 17 has fixed thereto and spaced therefrom the outer casing 18 to provide the space 19 between the dies for the introduction of steam, flame or other heating medium through the inlet pipe 20, which heated medium may escape through the outlet pipe 30, thus heating the female die 17 to a high temperature during its passage through space 19. The inner face of the female die 17 is provided with intercommunicating grooves 21 connecting at their lower extremities with the cold water inlet pipe 22 and the cold water outlet pipe 23 for the purpose of chilling the mold after the molding operation has been completed in the heated dies. If desired, the male die 24 may be of solid material or resilient material such as rubber or the like.

In the operation of the dies shown in Fig. 2, metal shell 25 which is smooth and polished on its inner surface is first inserted into intimate contact throughout within the interior of the female die and directly in communication with the inner sides of the intercommunicating grooves 21. The material to be molded is then placed within the shell 25 and the male die then placed therewithin and suitable pressure applied to the dies between the platens of a press of desired strength. Steam, flame, hot air or other heating medium is then introduced through inlet pipe 20 into the space 19 and out through the outlet pipe 30. This heats to a high temperature the walls of the female die 17 and when a high pressure is applied to the dies causes the material of the article being molded to become plastic and flow into the shape of the mold and against the inner face of the shell 25. When the molding is completed the dies are either opened up and the combined molded article and shell 25 removed for chilling in a chilling die, or if the chilling is desired to be effected in the molding die cold water is introduced through the inlet pipe 22 and out through the outlet pipe 23. This cold water in passing through the intercommunicating grooves 21 cools the inner surfaces of the female die 17 and the shell, after which the shell and molded article may be removed, or the article removed and the shell remain in the female die if desired. Also, if desired, during the molding operation a heating medium may in addition to passing through inlet pipe 20 also be passed through the inlet pipe 22 instead of cold water so as to further facilitate the heating of the article, which after pressure has been applied to the dies will be molded and the article and shell 25 either immediately removed or after cooling by the passage of cold water through the intercommunicating grooves 21 as desired, or the article after such cooling may be removed without removing the shell.

Figure 3:
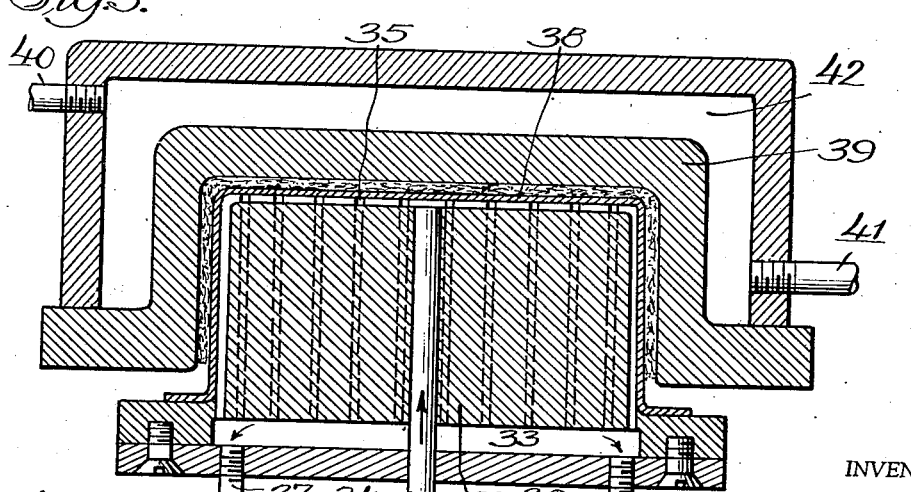
Fig. 3 is a vertical transverse section through a further modified form of a pair of pressing dies embodying my invention.

The form shown in Fig. 3 is similar to that shown in Fig. 2 except that the intercommunicating grooves are shown as formed on the exterior surface of the male die 32, which grooves eventually pass to the space 33 below the male die, the cooling or heating medium passing upwardly through the tube 34 and into the space formed by the intercommunicating grooves 35, and thence down through these grooves into space 33 and out through the outlet pipes 36 and 37. In this form the polished metal shell 38 is first applied over the male die 32, and after the material to be molded has been placed in the cavity of the female die 39 the male die will be inserted into the female die and pressure applied between the platens of a suitable press and the molding carried out under heat, such heat being supplied by steam, flame, heated air or other heating medium entering the inlet pipe 40 and escaping through the outlet pipe 41 to raise the temperature of the female die 39 to a degree high enough to effect such molding operation. This heating medium preferably passes through the space 42 to effect such heating of the female die as required in the molding operation. If desired, a heating medium may also be passed through the inlet pipe 34, through intercommunicating grooves 35 into space 33 and out through pipes 36 and 37, or cold water may be passed therethrough for chilling purposes. The shell 38 will be removed with the molded article, which in this form will remain within the female die, after which chilling will take place or the metal shell may be removed together with the molded article from the interior of the female die for subsequent chilling in any desired manner.

As stated above, any or all of the male dies shown in the drawing may be rigid or resilient, such resiliency to be effected either by making the male die of rubber or with expanding mechanical jaws or any other suitable means of expanding the male die. As described above, it is seen that by providing my improved shell the molded article can be removed from the molding dies immediately after the molding operation without danger of the material of the molded article sticking to the heated die, thus enabling the heated die to be repeatedly used without the necessity of being intermittently cooled to release the molded article. The molded article and the shell will then be chilled either in a chilling die or otherwise as desired, thus greatly speeding up the production of such molded articles. The surface of the shell next to the molded article will be smooth and preferably polished, and on its opposite side fits tightly against the adjacent dies. Such shells may be of brass, copper or other material, chromium plated or not as desired. The grooves referred to above will preferably be small enough to prevent the die liner from being pushed into said grooves and otherwise marring the shape or surface of the molded article.

In Fig. 2 I have shown a sealing ring 50 extending circumferentially around the lower portion of the inside of the female die, the purpose of which seal is to prevent the heating or cooling medium from being forced out beyond the die liner or shell. Before removing the shell when used on only one side, or removing the shell when used on both sides of the molded article, the temperature of the article must be reduced below that at which the article is plastic or semi-plastic in order to prevent the material of the molded article sticking to the shell. This lowering of the temperature of the shell, as explained above, is effected by chilling the same either in a chilling die or with water or other cooling medium forced thereagainst.

The temperature of the heated die or dies may be such as desired for the required operation, but I have accomplished good results by using temperatures from 200° to 400° F. and pressure upon the dies of from 1000 to 3000 pounds per square inch. These figures are given as being illustrative only and not as limiting the scope of the invention.

Having now described my invention, I claim:

1. The method of molding an article of material which initially becomes plastic by heat and which would tend to stick to the mold while hot, which consists in placing in one of the dies of a mold a removable, smooth, hollow, metal shell of a size to mold all faces of one side of a single hollow article with relation to the outside and inside, molding an article in said mold by heat and pressure with the shell covering the end face and all of the side walls of one side of the article, opening the mold, removing the shell and article as a unit from the mold while hot and while the article would tend to stick to the dies, chilling the shell and article, removing the chilled shell from the article, and again using the shell in the mold without having to cool the mold.

2. The method of molding an article of material which initially becomes plastic by heat and which would tend to stick to the mold while hot, which consists in placing in one of the dies of a mold a removable, smooth, hollow, metal shell of a size to mold all faces of one side of a single hollow article with relation to the outside and inside, molding an article in said mold by heat and pressure with the shell covering the end face and all of the side walls of one side of the article, opening the mold, removing the shell and article as a unit from the mold while hot and while the article would tend to stick to the dies, chilling the shell and article, removing the chilled shell from the article, and again using the shell in the mold without having to cool the mold, and during the pressing operation expanding the die other than the one to which the shell is applied.

3. In apparatus for molding a hollow article of material that will become plastic and tend to stick to a face of a die when initially heated, a mold comprising a pair of dies, one of said dies being heated, a hollow, one-piece, smooth, metal shell closely fitting the end and side walls of one of said dies and contacting the entire facial area of one side of the article being molded, said contacting face of the shell forming one face of the mold, means for heating said heated die, means for applying pressure to the dies to mold an article from the material therein, said shell being removable together with the hot article as a unit from the dies, for chilling, removal from the article without sticking and for reuse.

4. In apparatus for molding a hollow article of material that will become plastic and tend to stick to a face of a die when initially heated, a mold comprising a pair of dies, one of said dies being heated, a hollow, one-piece, smooth, metal shell closely fitting the end and side walls of one of said dies and contacting the entire facial area of one side of the article being molded, said contacting face of the shell forming one face of the mold, means for heating said heated die, means for applying pressure to the dies to mold an article from the material therein, said shell being removable together with the hot article as a unit from the dies, for chilling, removal from the article without sticking and for reuse, the face of the die carrying the shell having intercommunicating grooves between the shell and die, means for introducing through said grooves a medium for causing a temperature change in the shell, said dies comprising a male die and a female die, said male die being yieldable and expandible under the pressure exerted thereagainst and the reaction of the article being molded.

COLIN KYLE.